(12) United States Patent
Mirshekari et al.

(10) Patent No.: US 10,020,758 B2
(45) Date of Patent: Jul. 10, 2018

(54) THERMAL ENERGY HARVESTING DEVICE

(71) Applicants: STMicroelectronics (Crolles 2) SAS, Crolles (FR); SOCPRA Sciences et Génie S.E.C., Sherbrooke (CA)

(72) Inventors: Gholamreza Mirshekari, Sherbrooke (CA); Etienne Leveille, St-Placide (CA); Luc Guy Frechette, Sherbrooke (CA); Stephane Monfray, Eybens (FR); Thomas Skotnicki, Crolles-Montfort (FR)

(73) Assignees: STMicroelectronics (Crolles 2) SAS, Crolles (FR); SOCPRA Sciences et Génie S.E.C., Sherbrooke (CA)

( * ) Notice: Subject to any disclaimer, the term of this patent is extended or adjusted under 35 U.S.C. 154(b) by 348 days.

(21) Appl. No.: 15/042,293

(22) Filed: Feb. 12, 2016

(65) Prior Publication Data

US 2016/0241168 A1   Aug. 18, 2016

(30) Foreign Application Priority Data

Feb. 13, 2015 (FR) .................... 15 51192

(51) Int. Cl.
*H02N 2/18* (2006.01)
*H01L 41/113* (2006.01)
(Continued)

(52) U.S. Cl.
CPC .................... *H02N 2/18* (2013.01)

(58) Field of Classification Search
CPC ........ H02N 2/18; H02N 2/185; B81B 3/0021; B81B 3/0018; B81B 3/0024;
(Continued)

(56) References Cited

U.S. PATENT DOCUMENTS

| | | | | |
|---|---|---|---|---|
| 3,524,031 A | * | 8/1970 | Mack | H01H 35/14 200/61.53 |
| 3,610,970 A | * | 10/1971 | Skinner | H02M 7/54 310/10 |

(Continued)

FOREIGN PATENT DOCUMENTS

FR   2986908 A1   8/2013

OTHER PUBLICATIONS

INPI Search Report and Written Opinion for FR 1551192 dated Dec. 18, 2015 (7 pages).

*Primary Examiner* — Edgardo San Martin
(74) *Attorney, Agent, or Firm* — Crowe & Dunlevy

(57) ABSTRACT

A first closed enclosure defines a cavity having an inner dimension smaller than 5 mm. At least one second resiliently deformable closed enclosure is connected in fluid communication with the first enclosure. A fluid at more than 90% in the liquid state fills the first and second enclosures. A first portion of the first enclosure is in contact with a hot source of a temperature higher than the evaporation temperature of the fluid. A second portion of the first enclosure located between the first portion and the resiliently deformable closed enclosure is in contact with a cold source at a temperature lower than the condensation temperature of the fluid. An electromechanical transducer is coupled to a deformable membrane of the resiliently deformable closed enclosure.

22 Claims, 5 Drawing Sheets

(51) Int. Cl.
*F03G 7/06* (2006.01)
*H02N 2/00* (2006.01)
*F03G 7/00* (2006.01)

(58) Field of Classification Search
CPC ....... B81B 2203/053; F01K 5/02; F03G 7/06; H01L 41/113; H01L 41/1138; H01L 37/02; H01L 37/00
See application file for complete search history.

(56) References Cited

U.S. PATENT DOCUMENTS

| | | | | |
|---|---|---|---|---|
| 3,778,021 A | * | 12/1973 | Alexander | G05D 23/1921 236/68 A |
| 3,846,984 A | * | 11/1974 | Siegel | F03G 7/06 60/509 |
| 4,036,019 A | * | 7/1977 | Siegel | F03G 6/00 60/531 |
| 4,041,705 A | * | 8/1977 | Siegel | F03G 7/04 60/497 |
| 4,140,936 A | * | 2/1979 | Bullock | H01L 41/0933 310/328 |
| 4,203,295 A | * | 5/1980 | Siegel | F03G 6/00 60/531 |
| 5,186,001 A | * | 2/1993 | Muntz | F01B 29/00 60/508 |
| 6,750,596 B2 | * | 6/2004 | Kim | H02N 2/18 310/339 |
| 7,329,959 B2 | * | 2/2008 | Kim | B81B 3/0024 290/1 R |
| 8,378,558 B2 | * | 2/2013 | Skotnicki | H02N 2/18 310/339 |
| 8,773,003 B2 | * | 7/2014 | Skotnicki | H02N 2/18 310/306 |
| 9,444,371 B2 | * | 9/2016 | Ollier | H01L 41/047 |
| 9,735,707 B2 | * | 8/2017 | Monfray | H02N 2/18 |
| 2001/0032663 A1 | * | 10/2001 | Pelrine | F02G 1/043 136/205 |
| 2002/0043895 A1 | * | 4/2002 | Richards | F02B 75/34 310/328 |
| 2004/0124738 A1 | | 7/2004 | Pelrine et al. | |
| 2008/0067893 A1 | | 3/2008 | Peacock | |
| 2008/0202114 A1 | * | 8/2008 | Naterer | F02G 1/043 60/508 |
| 2011/0095655 A1 | | 4/2011 | Skotnicki | |
| 2016/0173003 A1 | * | 6/2016 | Monfray | B81B 3/0021 310/306 |
| 2017/0264164 A1 | * | 9/2017 | Lenk | F03G 7/04 |

* cited by examiner

THERMAL ENERGY HARVESTING DEVICE

PRIORITY CLAIM

This application claims the priority benefit of French Application for Patent No. 1551192, filed on Feb. 13, 2015, the contents of which is hereby incorporated by reference in its entirety to the maximum extent allowable by law.

TECHNICAL FIELD

The present disclosure relates to a device for harvesting the thermal energy dissipated by certain devices, for example, a hot surface of an integrated circuit chip, a car exhaust pipe, the roof of a house. The invention particularly aims at the conversion of this thermal energy into electricity.

BACKGROUND

Many devices have been provided to harvest the thermal energy released by a hot source and to convert it into electricity.

Thermo-electromechanical transducers or thermoelectric generators formed from a tightly closed enclosure having one or a plurality of drops of a liquid enclosed therein have been provided in U.S. Pat. Nos. 8,773,003 and 8,378,558 and in French Patent No. 2986908 (all incorporated herein by reference). In such generators, the volume of the enclosure is much greater than that of the liquid that it contains, that is, the enclosure is mainly filled with gas or vapor of the liquid. When the liquid reaches a hot wall of the enclosure, a sudden evaporation creating an overpressure in the enclosure occurs. The overpressure causes a deformation of a membrane supporting a piezoelectric transducer, whereby electricity is generated. The generated vapor condensates into one or a plurality of drops on a cold wall of the enclosure and a new evaporation-condensation cycle can start.

A disadvantage of the thermoelectric generators of U.S. Pat. Nos. 8,773,003 and 8,378,558 is that they should be properly oriented so that the liquid drops displace from the cold wall to the hot wall under the effect of gravity.

The thermoelectric generator of French Patent No. 2986908 comprises means for promoting the displacement of a drop from the cold wall to the hot wall of an enclosure and for doing away with gravity. A disadvantage of this type of generator is that the displacement means are complex, whereby the generator is expensive to implement.

The inventors of the present application have provided in article "A microfluidic heat engine based on explosive evaporation", Proceedings PowerMEMS 2012, pages 175-178 (incorporated herein by reference), a thermoelectric generator having a liquid introduced by a pump into a deformable chamber topped with a piezoelectric transducer. The chamber is heated so that a sudden evaporation of the liquid occurs, which causes an overpressure in the chamber. The overpressure causes a deformation of the chamber and of the piezoelectric transducer, and thus the generation of electricity. The generated vapor is then discharged into the atmosphere. A disadvantage of this type of generator is that it is necessary to use a pump, which makes the generator bulky.

Another disadvantage of the above-mentioned thermoelectric generators is that they have a pulsed operation and thus a low efficiency.

It would be desirable to have a thermal energy harvesting device which overcomes at least some of the disadvantages of existing generators.

SUMMARY

Thus, an embodiment provides a device comprising a first closed enclosure defining a cavity having, parallel to a direction, a dimension smaller than 5 mm; at least one second resiliently deformable closed enclosure communicating with the first enclosure; and a fluid at more than 90% in the liquid state filling the first and second enclosures, wherein a first portion of the first enclosure is capable of being in contact with a hot source at a temperature higher than the evaporation temperature of the fluid, and at least a second portion of the first enclosure, close to the first portion, is capable of being in contact with a cold source at a temperature lower than the condensation temperature of the fluid.

According to an embodiment, the internal wall of the first enclosure is microstructured.

According to an embodiment, the internal wall of the first enclosure is coated with microbeads having a diameter in the range from 1 to 100 µm.

According to an embodiment, the temperature of the hot source is higher by at least 20° C. than the evaporation temperature of the fluid.

According to an embodiment, said dimension of the cavity is in the range from 0.1 to 1 mm.

According to an embodiment, the first enclosure is a tube.

According to an embodiment, the tube has a first closed end and a second end which opens into a second enclosure, the second portion being arranged between the second enclosure and the first portion, which is arranged on the closed end side of the tube.

According to an embodiment, the device comprises two second enclosures, each of which has one end of the tube opening into it, a first part of the second portion being arranged between the first portion and one of the second enclosures, and a second part of the second portion being arranged between the first portion and the other one of the second enclosures.

According to an embodiment, the two ends of the tube open into the same second enclosure, two second portions being arranged on either side of the first portion.

According to an embodiment, the tube comprises at least one tapered portion, one of said at least one tapered portion being capable of being in contact with the hot source.

According to an embodiment, the first enclosure comprises two opposite parallel plates, each of the plates having a central portion surrounded with a ring-shaped portion, the central portions being opposite each other, the ring-shaped portions being opposite each other, at least one circular portion forming the first portion of the enclosure, and at least one ring-shaped portion forming the second portion of the enclosure.

An embodiment provides a thermoelectric generator comprising a device such as hereabove, and an electromechanical transducer connected to each second enclosure.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1A:
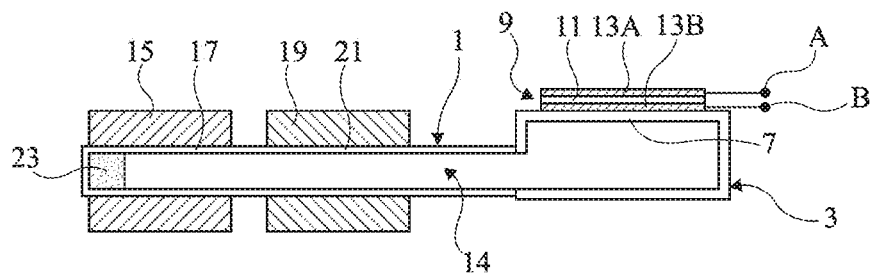
FIGS. 1A to 1D are simplified cross-section views illustrating the operating principle of a first embodiment of a thermoelectric generator.

The same elements have been designated with the same reference numerals in the different drawings and, further, the various drawings are not to scale.

In the following description, terms qualifying a position such as terms "upper", "lower", "topped", "left-hand", "right-hand", "top", "bottom", etc., refer to the representation of the concerned elements in the corresponding drawings. Unless otherwise specified, expressions "substantially" and "approximately" mean to within 10%, preferably to within 5%.

FIGS. 1A to 1D are simplified cross-section views illustrating a first embodiment of a thermoelectric generator and the operating principle thereof. In this embodiment, a tube 1 associated with cold and hot sources communicates with an expansion chamber 3. It will be seen hereafter that tube 1 may be replaced with an enclosure having a different geometric configuration.

The thermoelectric generator of FIGS. 1A to 1D comprises a tube 1 having one end opening into an expansion chamber 3 and having its other end closed. The tube for example has a circular cross-section with an inner diameter smaller than or equal to approximately 5 mm. A resiliently deformable membrane 7 forms the upper wall of chamber 3 and is coated with an electromechanical transducer 9. Transducer 9 is, for example, made of a layer 11 of a piezoelectric material arranged between two electrodes 13A and 13B coupled to respective terminals A and B.

Before sealing, the enclosure formed of tube 1 and of chamber 3 is filled with a fluid 14 which is totally or almost totally, that is, at more than 90%, in the liquid state. In other words, the enclosure may be totally filled with fluid 14 in the liquid state or may for example be totally filled with fluid 14 in the liquid state and by a bubble of fluid 14 in the vapor state. In this last case, the bubble takes up less than 10% of the enclosure volume, the rest of the enclosure volume being occupied by the liquid.

In operation, a hot source 15 is in contact with a portion 17 of tube 1 called the "hot portion" in the following description, and a cold source 19 is in contact with a portion 21 of tube 1 called the "cold portion" in the following description. The hot and cold portions neighbor each other, that is, they are sufficiently close to allow the operation described hereafter. Hot portion 17 is located on the side of the closed end of tube 1 and cold portion 21 is located between hot portion 17 and expansion chamber 3, in the vicinity of the hot portion. The temperature of hot source 15 is higher than the evaporation temperature of fluid 14, and the temperature of cold source 19 is lower than the condensation temperature of fluid 14. Thus, after placing tube 1 in contact with the hot and cold sources 15 and 19, the temperature of fluid 14 is higher than its evaporation temperature at the level of hot portion 17 and lower than its condensation temperature at the level of cold portion 21. A bubble 23 of fluid 14 in the vapor state then forms in tube 1, at the level of hot portion 17. Bubble 23 positions on the closed end side of hot portion 17 where it occupies, in directions transverse to the tube, the entire space available in the tube. A cyclic operation of the generator, which will be described in relation with FIGS. 1A-1D, can then be observed.

FIG. 1A shows the generator at the beginning of an operating cycle. A bubble 23 is present in hot portion 17, at the level of the closed end of tube 1. The volume of bubble 23 has a minimum value and membrane 7 is in low position.

Due to the fact that, in hot portion 17, the temperature of fluid 14 is higher than its evaporation temperature, fluid 14 in the liquid state evaporates.

Figure 1B:
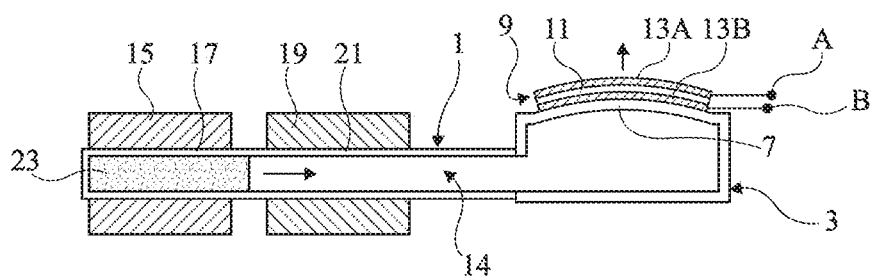

As illustrated in FIG. 1B, the evaporation of part of fluid 14 in the liquid state causes an increase in the volume of bubble 23, which causes a deformation of membrane 7.

Figure 1C:
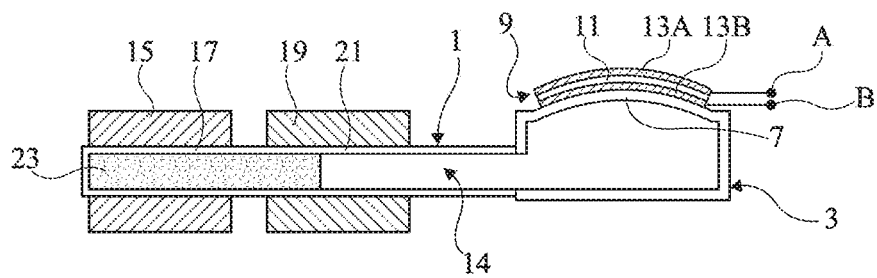

At the step illustrated in FIG. 1C, the volume increase of bubble 23 has carried on and the volume of bubble 23 has reached a maximum value. Bubble 23 then extends all the way into cold portion 21 of the tube and the deformation of membrane 7 is at maximum. The vapor of bubble 23 then starts condensing, which causes a decrease in the volume of bubble 23, whereby membrane 7 deforms towards its low position.

Figure 1D:
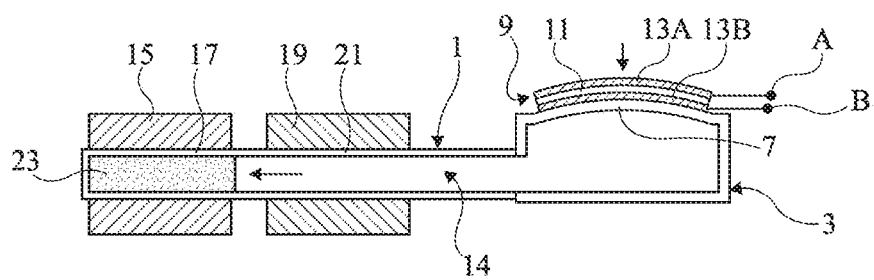

FIG. 1D shows the generator in an intermediate state while the liquid-vapor interface displaces leftwards. The volume of bubble 23 continues to decrease and, at the end of the operating cycle, the generator has returned to the state described in relation with FIG. 1A.

A new evaporation-condensation cycle may start.

The cyclic deformation of the membrane is transmitted to piezoelectric material layer 11, whereby an AC voltage appears between terminals A and B having this layer 11 of electromechanical transducer 9 coupled therewith.

A thermoelectric generator of the type in FIGS. 1A to 1D enables to convert thermal energy into electricity without it being necessary to provide a continuous liquid supply by means of a pump.

According to an advantage, all the overpressure resulting from the evaporation of part of fluid 14 is transmitted to membrane 7 via fluid 14 in liquid form.

In the case where the inner diameter of tube 1 is smaller than approximately 1 mm, due to the predominance of capillarity phenomena over gravity, it is not necessary for the generator to be horizontally arranged, and this generator may be provided to be oriented in different ways, for example, vertically. In the case of a tube having a larger inner diameter, it may be necessary to arrange the tube horizontally.

In an embodiment, the inner diameter of tube 1 is in the range from 100 to 300 μm and may be equal to 250 μm, chamber 3 having a height in the range from 0.25 to 1 mm, for example, 0.5 mm, and sides of a length in the range from 0.75 to 1.5 mm, for example, 1 mm.

Fluid 14 for example is ethanol, methanol, or water having respective atmospheric pressure evaporation temperatures of 78° C., 65° C., and 100° C. Fluid 14 may be a mixture of miscible fluids. The evaporation temperature of fluid 14 may be adjusted by adapting the pressure in the enclosure formed of tube 1 and of chamber 3 before closing thereof.

Figure 2:
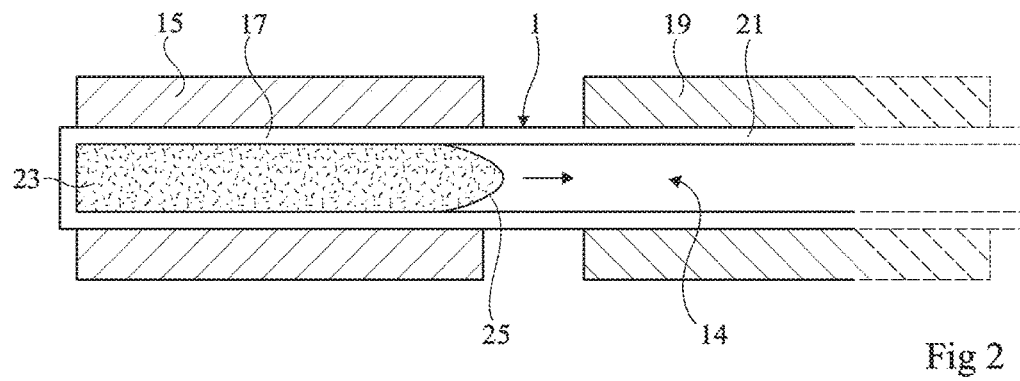
FIG. 2 is a partial enlarged view of a thermoelectric generator of the type in FIGS. 1A to 1D.

FIG. 2 is an enlarged view of a portion of the thermoelectric generator of FIGS. 1A to 1D. This drawing shows the generator at an intermediate state while the volume of bubble 23 is increasing. The interface between fluid 14 in the liquid state and the vapor of bubble 23 forms a meniscus 25 having its convexity directed towards the liquid side.

Figure 3:
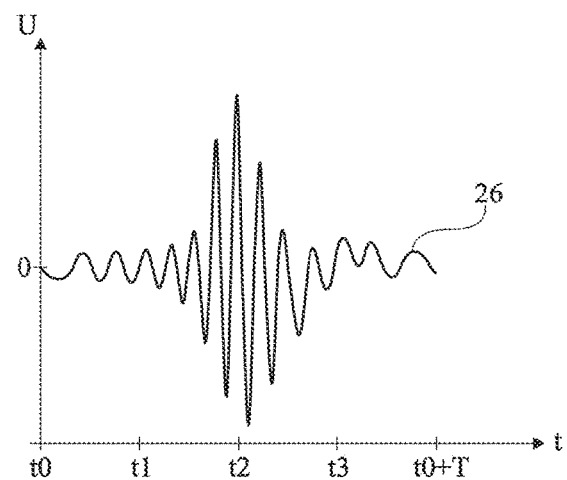
FIG. 3 illustrates the time variation of the voltage provided by a thermoelectric generator of the type in FIG. 2.

FIG. 3 shows a curve 26 illustrating the variation over time t of voltage U provided by a thermoelectric generator of the type in FIG. 2, time t and voltage U being indicated in arbitrary linear scales. Curve 26 has successive oscillations, each of which corresponds to one evaporation-condensation cycle.

Between a time t0 and a time t1, the amplitude of the oscillations is low, which indicates that the liquid-vapor interface displaces little in the tube. The liquid-vapor interface is then located substantially between the hot portion and the cold portion.

Between time t1 and a time t2, the amplitude of the oscillations progressively increases to reach a maximum value. The amplitude of the displacement of the liquid-vapor interface from one evaporation-condensation cycle to the next one increases. This corresponds to the operation described in relation with FIGS. 1A to 1D.

Between time t2 and a time t3, the amplitude of the oscillations progressively decreases.

Between time t3 and a next time t0+T, the oscillations have a low amplitude again, just as between times t0 and t1.

After time t0+T, the variation of voltage U such as illustrated on interval t0 and t0+T is periodically repeated.

Due to the fact that a plurality of evaporation-condensation cycles occur one after the others in a generator of the type in FIG. 2, the quantity of electricity generated by such a generator is higher than that generated by a generator of the type in the previously-mentioned patents and article, which have a pulsed operation and thus a lower efficiency.

As an example, for a thermoelectric generator of the type in FIG. 2 with a tube 1 having a 2-mm inner diameter, the duration of an oscillation may be approximately 0.01 second and T may be equal to approximately 0.1 second.

Figure 4:
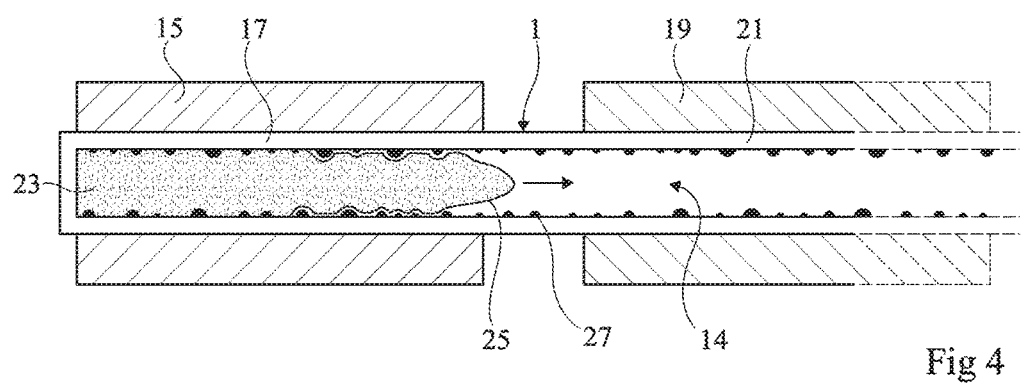
FIG. 4 is a partial enlarged view of a thermoelectric generator of the type in FIGS. 1A to 1D according to an alternative embodiment.

FIG. 4 is an enlarged view of a portion of the generator of FIGS. 1A to 1D according to an alternative embodiment. This drawing shows the generator at an intermediate state while the volume of bubble 23 is increasing. In this alternative embodiment, the inner wall of tube 1 is microstructured. For example, the inner portion of tube 1 is coated with microbeads 27, for example having diameters in the range from 1 to 100 µm. As in FIG. 2, the interface between the fluid in the liquid state and bubble 23 forms a meniscus 25.

As a result of the microstructuring of the inner wall of tube 1, meniscus 25 is more stretched than in FIG. 2. Thus, the surface area of the liquid-vapor interface of fluid 14 is larger in the case of FIG. 3 than in the case of FIG. 2. This results, during the bubble expansion phase, in an increase in the quantity of liquid evaporated at any time, and thus an increase in the speed and the displacement amplitude of meniscus 25 in tube 1.

Similarly, while the volume of bubble 23 is decreasing, the microstructuring of the inner wall of tube 1 causes an increase in the surface area of meniscus 25, which results, during the bubble contraction phase, in an increase in the quantity of vapor condensed at any time, and thus an increase in the speed and the displacement amplitude of meniscus 25 in tube 1.

The inner wall of tube 1 may be microstructured over the entire portion of tube 1 traveled by meniscus 25 or all along the length of tube 1. The microstructured wall may also be grooved, porous, hydrophobic, and/or hydrophilic, the unevennesses having dimensions in the range from 1 to 100 µm. A microstructuring of the inner wall of tube 1 may be obtained by chemical etching of this wall, for example, with hydrofluoric acid when the tube is made of glass.

Figure 5:
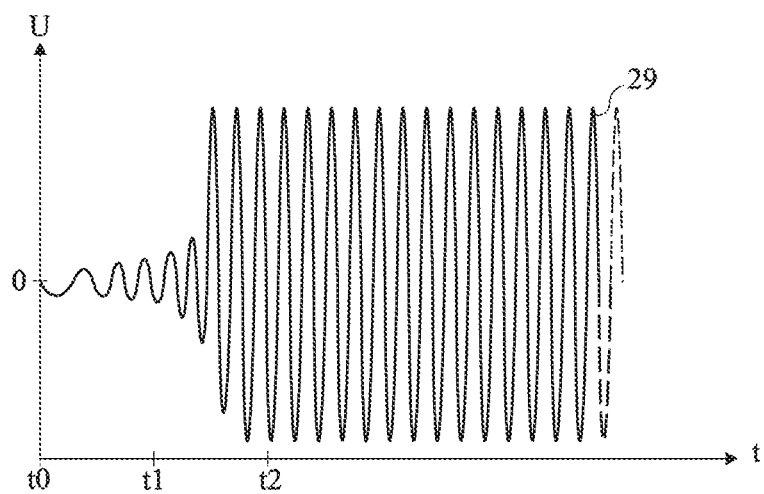
FIG. 5 illustrates the time variation of the voltage provided by a thermoelectric generator of the type in FIG. 4.

FIG. 5 shows a curve 29 illustrating the variation over time t of voltage U provided by a thermoelectric generator of the type in FIG. 4, time t and voltage U being indicated in arbitrary linear scales. Curve 29 has successive oscillations, each of which corresponds to an evaporation-condensation cycle.

As in FIG. 2, between a time t0 and a time t1, the oscillations have a low amplitude and then, between time t1 and a time t2, the amplitude of the oscillations progressively increases to reach a maximum value. However, unlike what has been described in relation with FIG. 3, after time t2, continuous oscillations of maximum amplitude can be observed.

It can be observed that the obtaining of continuous oscillations such as illustrated in FIG. 5 is promoted by the microstructuring of the inner wall of the generator tube. Thus, the microstructuring of the inner wall of the tube causes an increase in the quantity of electricity generated by a generator of the type in FIGS. 1A to 1D.

In generators of the type in FIG. 2 or in FIG. 4, it can be observed that the higher the temperature of hot source 15 is than the evaporation temperature of fluid 14, the greater the amplitude and the displacement speed of the liquid-vapor interface, which causes a greater deformation of membrane 7, and thus an increase in the quantity of electricity generated by the generator. More specifically, when the temperature of the hot source is higher by at least 20° C. than the evaporation temperature of fluid 14, it can be observed that the liquid present in the hot portion is overheated and that part of this liquid almost instantaneously evaporates. This results in a much faster and significant increase in the volume of bubble 23, and thus in an increase in the quantity of electricity generated by such a generator.

Figure 6:
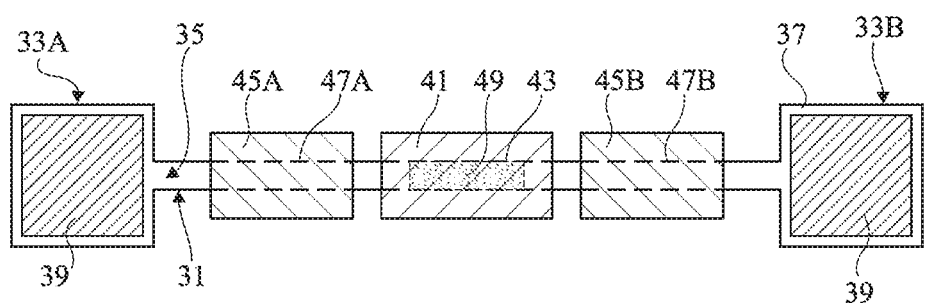
FIG. 6 is a simplified top view of a second embodiment of a thermoelectric generator.

FIG. 6 is a top view schematically showing a second embodiment of a thermoelectric generator. The generator comprises a tube 31 and two expansion chambers 33A and 33B. A first end of tube 31 opens into expansion chamber 33A, and a second end of tube 31 opens into expansion chamber 33B. Each of chambers 33A and 33B comprises a resiliently deformable membrane 37 coated with an electromechanical transducer 39. A fluid 35 totally or almost totally in the liquid state fills the enclosure formed of tube 31 and of the two chambers 33A and 33B.

In operation, a hot source 41 is placed in contact with a central portion 43 (hot portion) of tube 31. Between central portion 43 and chamber 33A, a cold source 45A is in contact with a portion 47A (cold portion) of tube 31, and, between central portion 43 and chamber 33B, a cold source 45B is in contact with a portion 47B (cold portion) of tube 31. Like the generator of FIGS. 1A to 1D, the generator of FIG. 6 operates cyclically. At the beginning of an operating cycle, a bubble 49 of minimum volume is present in the middle of hot portion 43. The temperature of fluid 35 at the level of hot portion 43 is higher than its evaporation temperature and part of fluid 35 in the liquid state evaporates. Such an evaporation causes an increase in the volume of bubble 49, which simultaneously expands towards cold portion 47A and towards cold portion 47B of tube 31. When the volume of bubble 49 reaches a maximum value and the bubble extends all the way into cold portions 47A and 47B, the vapor starts condensing and bubble 49 contracts until its volume is at minimum. The cyclic expansion and contraction of the volume of bubble 49 cause a cyclic and simultaneous deformation of membranes 37 of chambers 33A and 33B, and thus an electric power generation by transducers 39.

Figure 7:
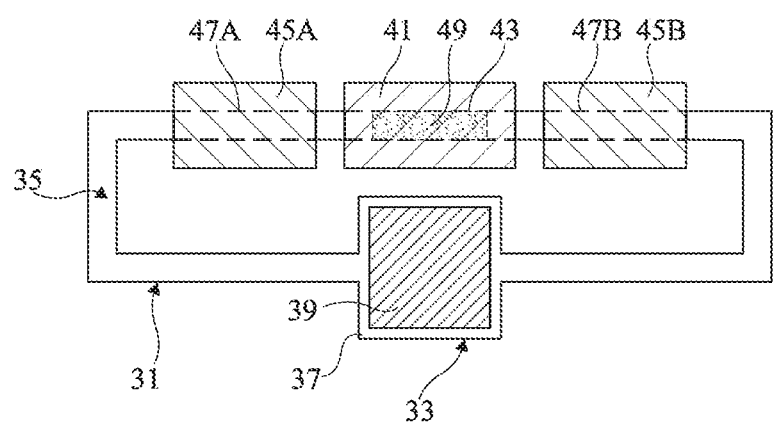
FIG. 7 is a simplified top view of an alternative embodiment of a thermoelectric generator of the type in FIG. 6.

FIG. 7 is a top view schematically showing an alternative embodiment of a thermoelectric generator of the type in FIG. 6. In this variation, the ends of tube 31 open into a same deformable expansion chamber 33. The operation is the same as that described in relation with FIG. 6.

Figure 8:
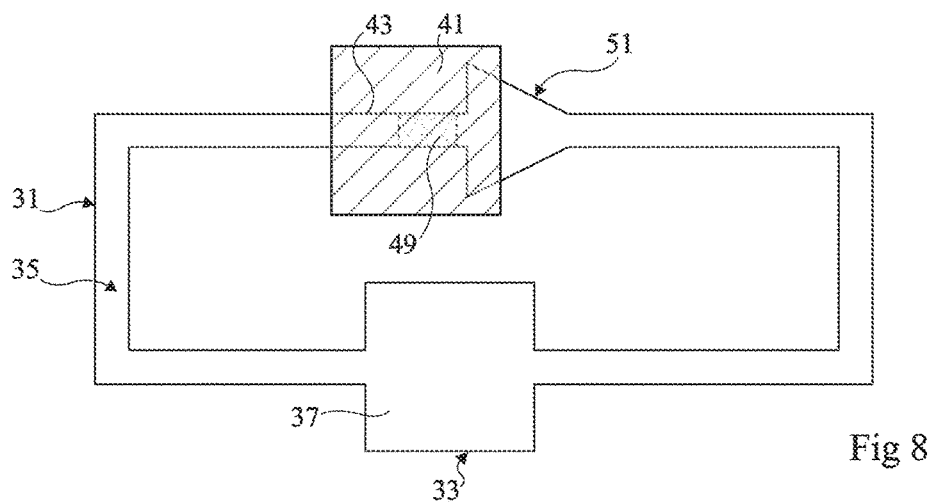
FIG. 8 is a simplified top view of an embodiment of a thermal energy harvesting device.

FIG. 8 is a top view schematically showing an embodiment of a thermal energy harvesting device. This device is similar to that in FIG. 7, but further comprises a check valve type system for example formed, as illustrated, of a tapered portion 51 of tube 31. In this embodiment, tapered portion 51 is astride hot source 41 and the cold source, not shown, so that, during an evaporation-condensation cycle, bubble 49 expands all the way into tapered portion 51 before contracting.

At the liquid-vapor interface, capillary forces are directed differently in tapered portion 51 and in the rest of tube 31. The resultant of the capillary forces is directed towards the narrower part of tapered portion 51. This results in a circulation of fluid 35 in this direction and thus in a better cooling of hot source 41. Such a device may be used as a simple circulator or also as a thermoelectric generator by associating an electromechanical transducer with deformable chamber 33.

As previously indicated, the tube of the thermoelectric generators described in relation with FIGS. 1A-1D to 7 may be replaced with an enclosure having a different geometric configuration such that the cavity that it delimits has, parallel to a direction, a dimension smaller than approximately 5 mm, preferably 1 mm, so that capillarity phenomena predominate over gravity, as indicated hereabove.

Figure 9A:
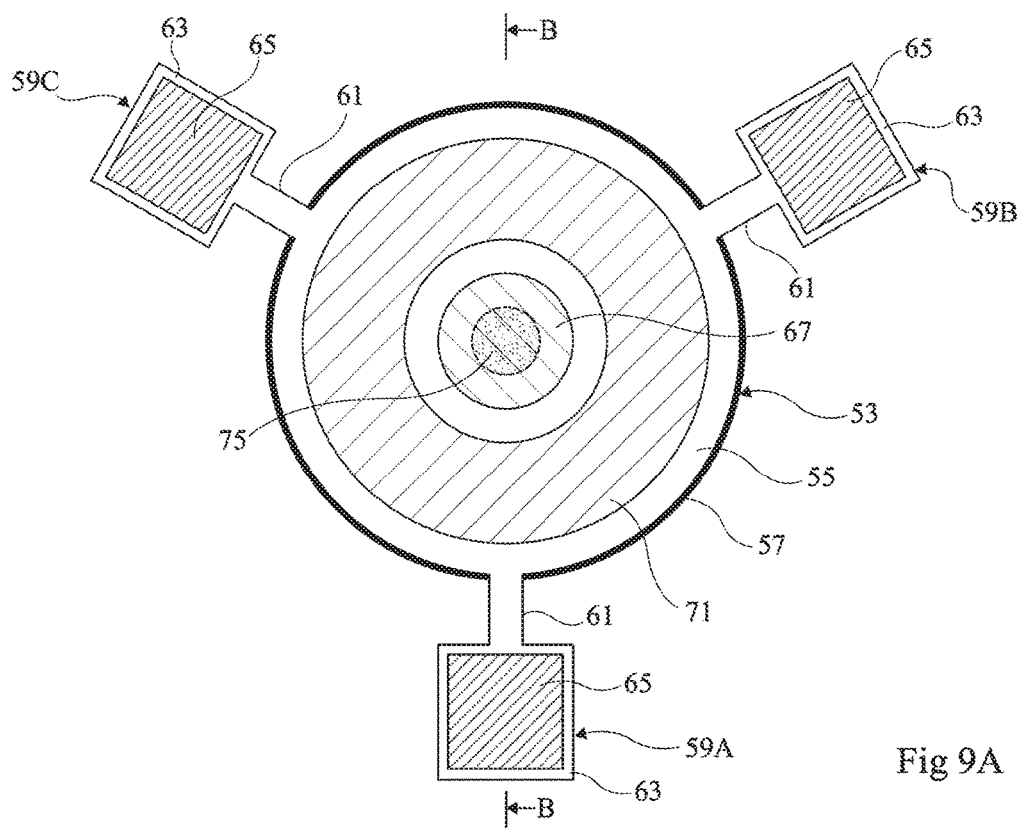
FIGS. 9A and 9B schematically show a third embodiment of a thermoelectric generator.
Figure 9B:
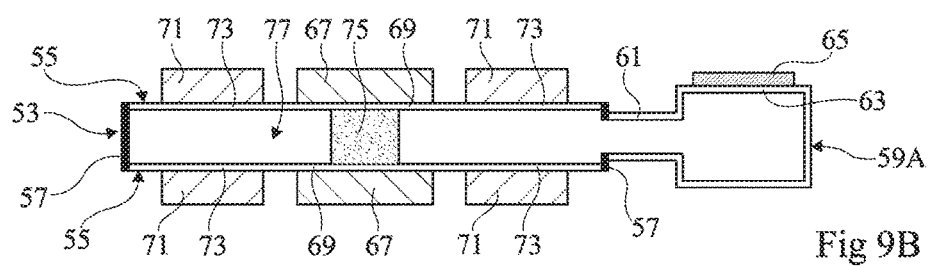

FIGS. 9A and 9B schematically show a thermoelectric generator comprising an example of such an enclosure, FIG. 9A being a top view of the generator and FIG. 9B being a cross-section view along plane BB of FIG. 9B. In this embodiment, an enclosure 53 is delimited by two parallel opposite plates 55, and by a lateral wall 57, the space separating the opposite surfaces of the two plates 55 being smaller than approximately 5 mm. The generator also comprises at least one expansion chamber, for example, three chambers 59A, 59B, and 59C. Each expansion chamber communicates with enclosure 53, for example, via a tubular portion 61 extending from the expansion chamber all the way to enclosure 53. Each expansion chamber comprises a resiliently deformable membrane 63 topped with an electromechanical transducer 65.

In operation, a hot source 67 is placed into contact with at least one of plates 55 at the level of a substantially central portion 69 of enclosure 53, and a cold source 71 is placed into contact with at least one of plates 55 at the level of a ring-shaped portion 73 of enclosure 53, around central portion 69. A bubble 75 of a fluid 77 filling enclosure 53 forms and positions at the center of hot portion 71, bubble 75 extending from one plate 55 to the other. Cycles of evaporation-condensation of fluid 77 then take place in enclosure 53, causing cycles of expansion-contraction of bubble 75 between hot portion 69 and cold portion 73 of enclosure 53. This results in cyclic deformations of membranes 65 of chambers 59A, 59B, and 59C, and in a generation of electric power by transducers 65.

Figure 10A:
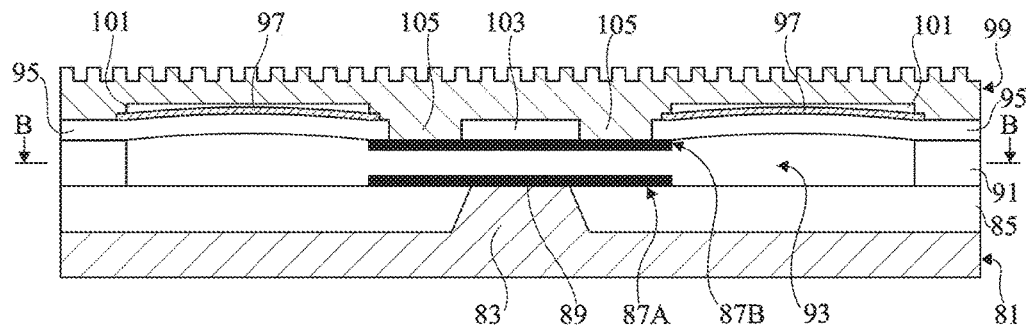
FIGS. 10A and 10B schematically show an embodiment of a device comprising a thermoelectric generator of the type in FIGS. 9A and 9B.
Figure 10B:
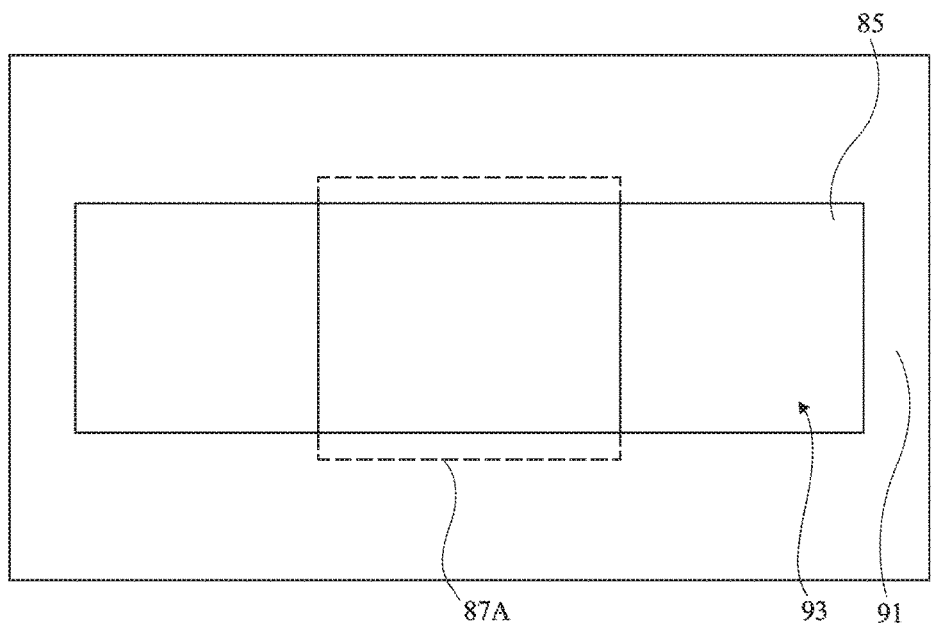

FIG. 10A is a simplified cross-section view showing an embodiment of a device comprising a thermoelectric generator, and FIG. 10B is a top view from plane BB of FIG. 10A. The device comprises a thermally-conductive plate 81 provided with a central pad 83 on its upper surface side. A thermally-insulating layer 85 substantially flush with the top of pad 83 covers the upper surface of plate 81. A plate 87A rests on layer 85 and has a central portion 89 in contact with pad 83. A thermally-insulating layer 91 covers the periphery of layer 85 and defines a cavity 93. A plate 87B parallel to plate 87A is arranged opposite plate 87A. Between plates 87A and 87B, cavity 93 has a height smaller than approximately 5 mm, preferably 1 mm. Two membranes 95 close cavity 93 between plate 87B and insulating layer 91. Each membrane 95 is topped with a piezoelectric transducer 97. A radiator plate 99 is arranged on the upper surface of the device. Opposite each membrane 95, radiator 99 comprises a recess 101 extending from its lower surface so that the membrane can move. Substantially opposite pad 83, the radiator comprises a recess 103 extending from its lower surface. Recess 103 may be filled with a thermal insulator which may be made of the same material as membranes 95 if they are made of a thermally-insulating material. Around recess 103, a ring-shaped portion 105 of radiator 99 is in contact with plate 87B. Cavity 93 is filled with a fluid which is totally or almost totally in the liquid state.

In this device, insulating layer 91 and plates 87A and 87B define an enclosure opening into two deformable expansion chambers which are delimited by insulating layers 85 and 91 and by membranes 95. This device thus forms a thermoelectric generator similar to that of FIGS. 9A and 9B, however only comprising two expansion chambers.

In operation, ring-shaped portion 105 of radiator 99 forms the cold source of the generator and, when the lower surface of plate 81 is in contact with a hot surface such as an integrated circuit chip surface, pad 83 forms the hot source of the generator. A bubble, not shown, then forms between plates 87A and 87B at the level of central portion 89 of plate 87A, and the generator operates in the same way as the generator of FIGS. 9A and 9B.

A plurality of devices of FIGS. 10A and 10B are for example simultaneously formed from plates which are then sawn to form individual devices. To form the device of FIGS. 10A and 10B, a first assembly comprising plate 81, layers 85 and 91, and plate 87A, may be formed, followed by a second assembly comprising radiator 99, membranes 95 and plate 87B, the first and second assemblies being then assembled on each other. Such assemblies are for example obtained by bonding together machined, thermoformed, and/or sintered elements. Such assemblies may also be formed by using techniques of deposition and etching of successive layers such as currently used in microelectronics.

As an example, plate 81 and radiator 99 are made of a metal such as copper or aluminum, or of a metal alloy such as brass. Insulating layers 85 and 91 may be made of glass or of a polymer, for example, an epoxy resin. Plates 87A and 87B may be made of glass, of silicon, or of a polymer. The material of membranes 95 may be a polymer or a metal.

Specific embodiments have been described in relation with FIGS. 1A-1D to 10A-10B. Various alterations, modifications, and improvements will readily occur to those skilled in the art. In particular, the expansion chambers may have one or a plurality of deformable walls other than the upper wall, for example, all the walls of these chambers may resiliently deform.

Electromechanical transducers other than piezoelectric transducers may be associated with the deformable chamber, for example, capacitive or inductive electromechanical transducers.

The chamber deformation may be used for other purposes than electric power generation. For example, the chamber deformation may be used to form an actuator.

It may also be provided for a plurality of tubes and enclosures opening into a same expansion chamber.

Various types of check valves may be used to promote the circulation of the fluid in a device of the type in FIG. 8. For example, the inner wall of the tube may be hydrophilic on one side of the hot portion of the tube, and less hydrophilic, or even hydrophobic, on the other side of this hot portion. In this case, the fluid will flow from the hot portion of the tube to the less hydrophilic tube portion.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A device, comprising:
a first closed enclosure defining a cavity having, parallel to a direction, a dimension smaller than 5 mm;
at least one second resiliently deformable closed enclosure communicating with the first enclosure; and
a fluid at more than 90% in the liquid state filling the first and second enclosures,
wherein a first portion of the first enclosure is configured to be in contact with a hot source at a temperature higher than an evaporation temperature of the fluid, and at least a second portion of the first enclosure, close to the first portion, is configured to be in contact with a cold source at a temperature lower than a condensation temperature of the fluid.

2. The device of claim 1, wherein an inner wall of the first enclosure is microstructured.

3. The device of claim 1, wherein an internal wall of the first enclosure is coated with microbeads having a diameter in the range from 1 to 100 µm.

4. The device of claim 1, wherein the temperature of the hot source is higher by at least 20° C. than the evaporation temperature of the fluid.

5. The device of claim 1, wherein said dimension of the cavity is in the range from 0.1 to 1 mm.

6. The device of claim 1, wherein the first enclosure is a tube.

7. The device of claim 6, wherein the tube has a first closed end and a second end which opens into a second enclosure, the second portion being arranged between the second enclosure and the first portion, which is arranged on the closed end side of the tube.

8. The device of claim 6, comprising two second enclosures, each of which having one end of the tube opening into it, said second portion comprising one part arranged between the first portion and one of the second enclosures, and another part arranged between the first portion and the other one of the second enclosures.

9. The device of claim 6, wherein the two ends of the tube open into the same second enclosure, the two parts of the second portion being arranged on either side of the first portion.

10. The device of claim 9, wherein the tube comprises a tapered portion being in contact with the hot source.

11. The device of claim 1, wherein the first enclosure comprises two opposite parallel plates, each of the plates having a central portion surrounded with a ring-shaped portion, the central portions being opposite each other, the ring-shaped portions being opposite each other, at least one circular portion forming the first portion of the enclosure, and at least one ring-shaped portion forming the second portion of the enclosure.

12. The device of claim 1, further comprising an electromechanical transducer coupled to each second enclosure.

13. A device, comprising:
a tubular structure have a first end and a second end;
a resiliently deformable closed enclosure in communication with the second end;
wherein the tubular structure and resiliently deformable closed enclosure are filled with a fluid at more than 90% in the liquid state;
wherein a first portion of the tubular structure is configured to be in contact with a hot source at a temperature higher than an evaporation temperature of the fluid, and
wherein a second portion of the tubular structure, located between the first portion and the resiliently deformable closed enclosure, is configured to be in contact with a cold source at a temperature lower than a condensation temperature of the fluid.

14. The device of claim 13, further comprising an electromechanical transducer coupled to a deformable membrane of the resiliently deformable closed enclosure.

15. The device of claim 13, wherein an inner surface of the tubular structure is micropatterned.

16. The device of claim 13, wherein an inner surface of the tubular structure is coated with microbeads having a diameter in the range from 1 to 100 µm.

17. The device of claim 13, wherein a distance between opposite inner surfaces of the tubular structure is smaller than or equal to approximately 5 mm.

18. The device of claim 13, wherein the first end is a closed and sealed end.

19. The device of claim 13, wherein the first end is in communication with the resiliently deformable closed enclosure.

20. The device of claim 13, further comprising an additional resiliently deformable closed enclosure in communication with the first end, wherein a third portion of the tubular structure, located between the first portion and the additional resiliently deformable closed enclosure, is configured to be in contact with an additional cold source at a temperature lower than the condensation temperature of the fluid.

21. A device, comprising:
a first enclosure formed by first and second opposite parallel plates and a peripheral wall joining the first and second opposite parallel plates, wherein the first and second opposite parallel plates are separated from each other by less than 5 mm;
a resiliently deformable closed enclosure communicating with the first enclosure at the peripheral wall; and
a fluid at more than 90% in the liquid state filling the first enclosure and the resiliently deformable closed enclosure, wherein a central portion of the first plate is surrounded with a ring-shaped portion; and wherein the central portion is configured to be in contact with a hot source at a temperature higher than an evaporation temperature of the fluid, and the ring-shaped portion is configured to be in contact with a cold source at a temperature lower than a condensation temperature of the fluid.

22. The device of claim 21, further comprising an electromechanical transducer coupled to a deformable membrane of the resiliently deformable closed enclosure.

* * * * *